(12) United States Patent
Hamaie et al.

(10) Patent No.: US 8,104,050 B2
(45) Date of Patent: Jan. 24, 2012

(54) OPTICAL DISK APPARATUS HAVING BRAKE PAD LOCATED NEAR TO FRONT END OF CHASSIS BLOCK

(75) Inventors: Seiji Hamaie, Kawasaki (JP); Nozomu Harada, Kawasaki (JP); Shinya Asano, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 554 days.

(21) Appl. No.: 12/329,878

(22) Filed: Dec. 8, 2008

(65) Prior Publication Data
US 2009/0235290 A1 Sep. 17, 2009

(30) Foreign Application Priority Data
Mar. 13, 2008 (JP) .................. 2008-064728

(51) Int. Cl.
G11B 17/03 (2006.01)
G11B 23/00 (2006.01)
(52) U.S. Cl. ...... 720/602; 720/601; 369/268; 369/270.1

(58) Field of Classification Search .................. 720/602
See application file for complete search history.

(56) References Cited

U.S. PATENT DOCUMENTS

| 5,883,870 | A * | 3/1999 | Akiba et al. .................. 720/602 |
| 6,577,577 | B2 * | 6/2003 | Watanabe et al. ............. 720/603 |
| 6,947,355 | B2 * | 9/2005 | Hong et al. ................. 369/30.27 |
| 7,503,053 | B2 * | 3/2009 | Chen et al. .................... 720/601 |
| 2008/0235715 | A1 * | 9/2008 | Washiya et al. ............... 720/601 |

FOREIGN PATENT DOCUMENTS

| JP | 11-345455 | 12/1999 |
| JP | 2003-085939 | 3/2003 |
| JP | 2003-151205 | 5/2003 |
| JP | 2005-092946 | 4/2005 |

* cited by examiner

Primary Examiner — Son Mai
(74) Attorney, Agent, or Firm — Kilpatrick Townsend & Stockton LLP

(57) ABSTRACT

Disclosed is a slim-type high speed rotation optical disk apparatus having a turn table for loading an optical disk thereon. As compared with conventional ones, a brake pad is located near to the front end so that the brake pad comes into tight contact with a side of the tray's front portion when the tray is inserted. This reduces the noise and vibration of the optical disk apparatus.

2 Claims, 14 Drawing Sheets

OPTICAL DISK APPARATUS HAVING BRAKE PAD LOCATED NEAR TO FRONT END OF CHASSIS BLOCK

CLAIMS OF PRIORITY

The present application claims priority from Japanese patent application serial no. JP 2008-064728, filed on Mar. 13, 2008, the content of which is hereby incorporated by reference into this application.

BACKGROUND OF THE INVENTION

The present invention relates to optical disk apparatus and in particular to an optical disk apparatus capable of suppressing its noise and vibration while the motor is driven to rotate. The present invention is suitable for a slim-type optical disk apparatus which is incorporated in a notebook-sized personal computer or the like.

As digital information read/write apparatus, CD drives, DVD drives and other optical disk apparatuses have since long been widespread.

Especially, with the popularity of notebook-sized personal computers (hereinafter "notebook PCs") in the recent years, light-weight ones designed to set an optical disk on a turn table have shown a tendency to increase in production quantity.

In addition, with the progress and development of optical disk technology for recording/reproducing, optical disk apparatus are expected to increase their storage capacities more and more. To read/write data from/to such an optical disk at high speed, it is demanded to further raise the disk rotation speed. Accordingly, optical disk apparatus are remarkably advancing in the drive speed, too.

To prevent a still rotating optical disk from coming out, the slim-type optical disk apparatus is provided with a brake pad. When the optical disk is to be ejected, the brake pad contacts the side of the optical disk to reduce its rotation speed.

For example, a brake pad whish is set at a side of the chassis is disclosed in FIG. 3 of Japanese Patent Laid-Open No. 2005-92946. Japanese Patent Laid-Open No. Hei. 11-345455 also discloses a similar brake pad in FIG. 1.

SUMMARY OF THE INVENTION

As the optical disk apparatus goes toward lighter weight, smaller size and higher speed disk rotation as mentioned above, the noise and vibration generated by the spindle motor driven to rotate at high speed become a problem.

Especially, it is pointed out that noise such as a buzz sound occurs annoyingly between the tray and the chassis if an unbalanced optical disk is set on the turn table and rotated thereon.

Such a weight-reduced optical disk apparatus as described above is employed by a notebook PC which is close to the user who operates it and therefore must be freer from noise and vibration than the desktop PC. It is also disadvantageous that the notebook PC is likely to cause stronger vibration due to its light weight body manufactured by (plastic) molding.

The present invention was made to solve the above-mentioned problem. It is an object of the present invention to provide a slim-type, high rotation speed optical disk apparatus with low noise and less vibration.

The present invention provides a slim-type optical disk apparatus having a turn table for loading an optical disk thereon. As compared with conventional ones, a brake pad is located nearer to the front end so that the brake pad comes into tight contact with a side of the tray's front portion when the tray is inserted.

This reduces the vibration caused by the rotation of the optical disk and consequently lowers the noise.

According to the above-mentioned construction of the present invention, a slim-type high speed rotation optical disk apparatus with low noise and less vibration can be provided.

DESCRIPTION OF THE PREFERRED EMBODIMENT

With reference to FIG. 1 through FIG. 5, the following will describe an embodiment of the present invention.

Figure 1A:
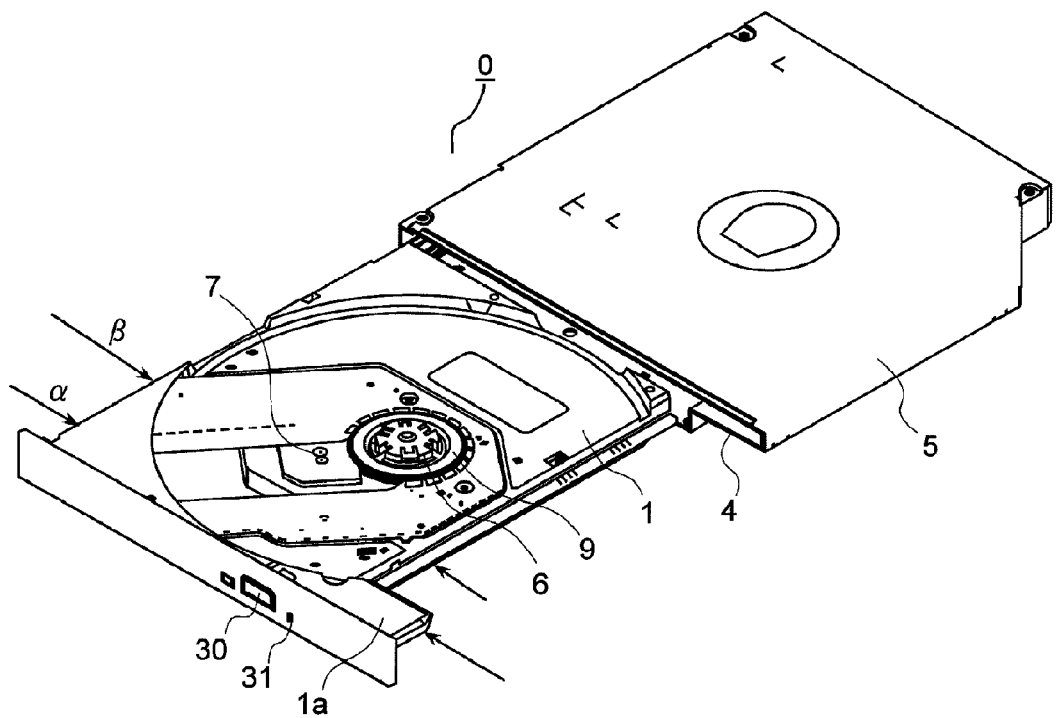
FIG. 1A is a (first) general perspective view of an optical disk apparatus in accordance with an embodiment of the present invention.
Figure 1B:
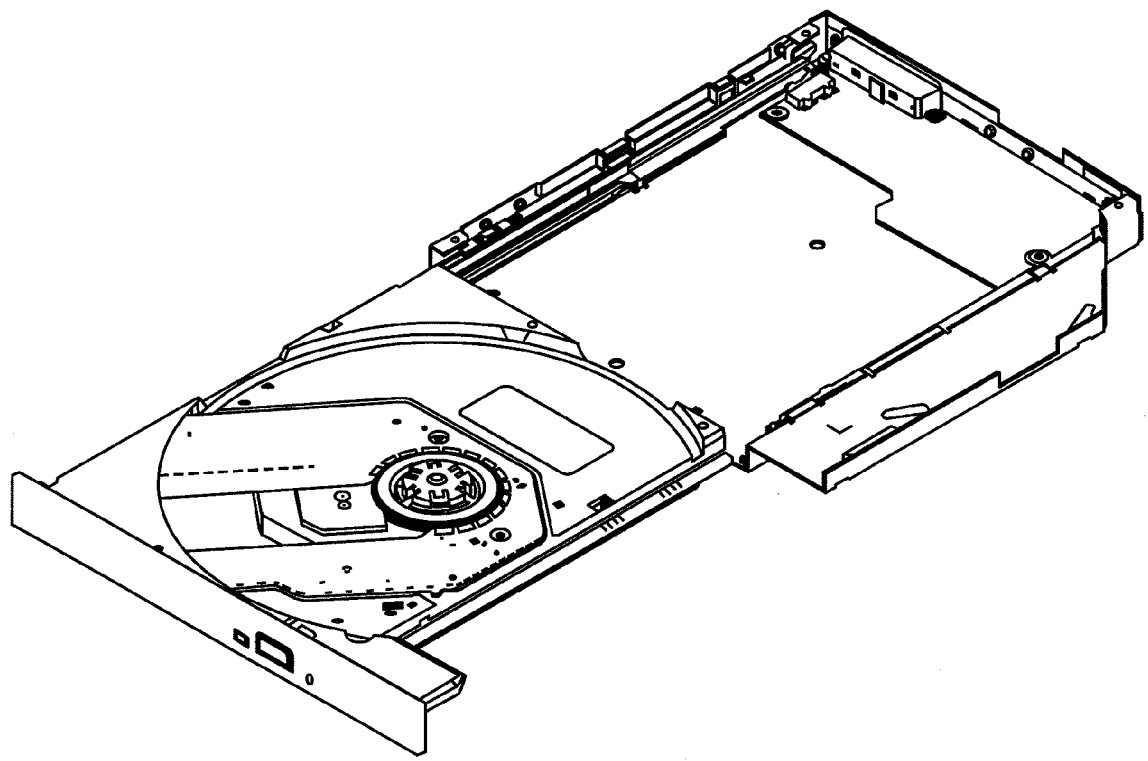
FIG. 1B is a (second) general perspective view of an optical disk apparatus in accordance with the embodiment of the present invention.

FIG. 1A and FIG. 1B provide general perspective views of an optical disk apparatus in accordance with an embodiment of the present invention.

Figure 2A:
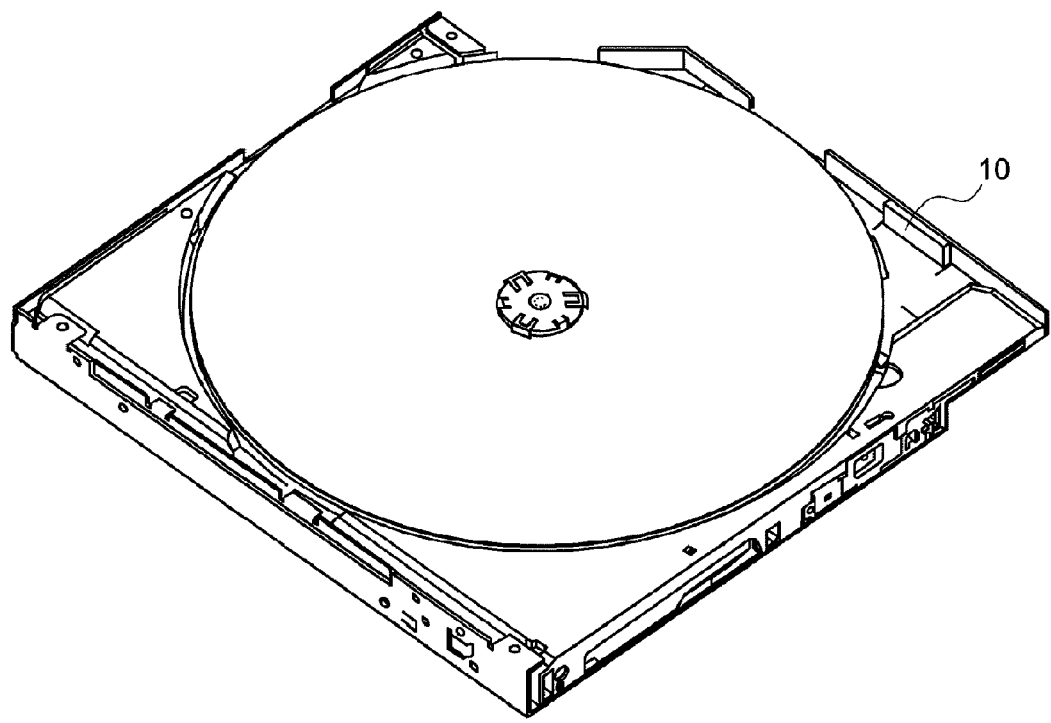
FIG. 2A is a perspective view of a prior art optical disk apparatus wherein the tray is inserted in the chassis.

FIG. 2A is a perspective view of a prior art optical disk apparatus wherein the tray is inserted in the chassis.

Figure 2B:
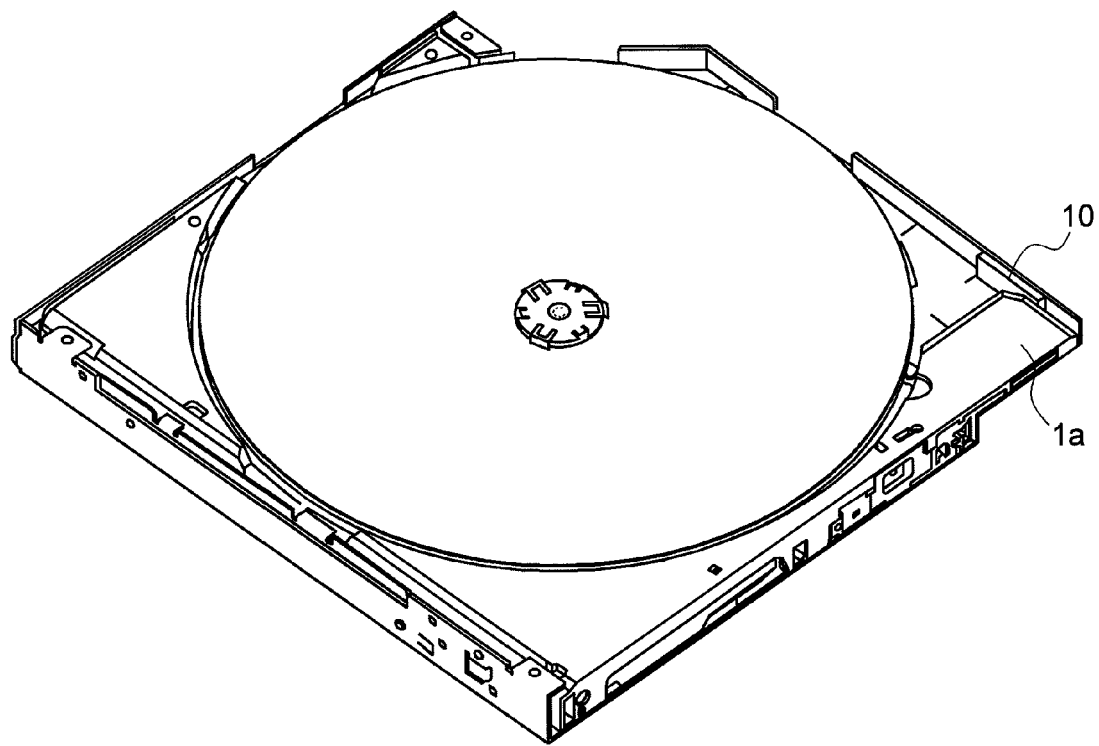
FIG. 2B is a perspective view of the optical disk apparatus in accordance with the embodiment of the present invention wherein the tray is inserted in the chassis.

FIG. 2B is a perspective view of the optical disk apparatus in accordance with the embodiment of the present invention wherein the tray is inserted in the chassis.

Figure 3A:
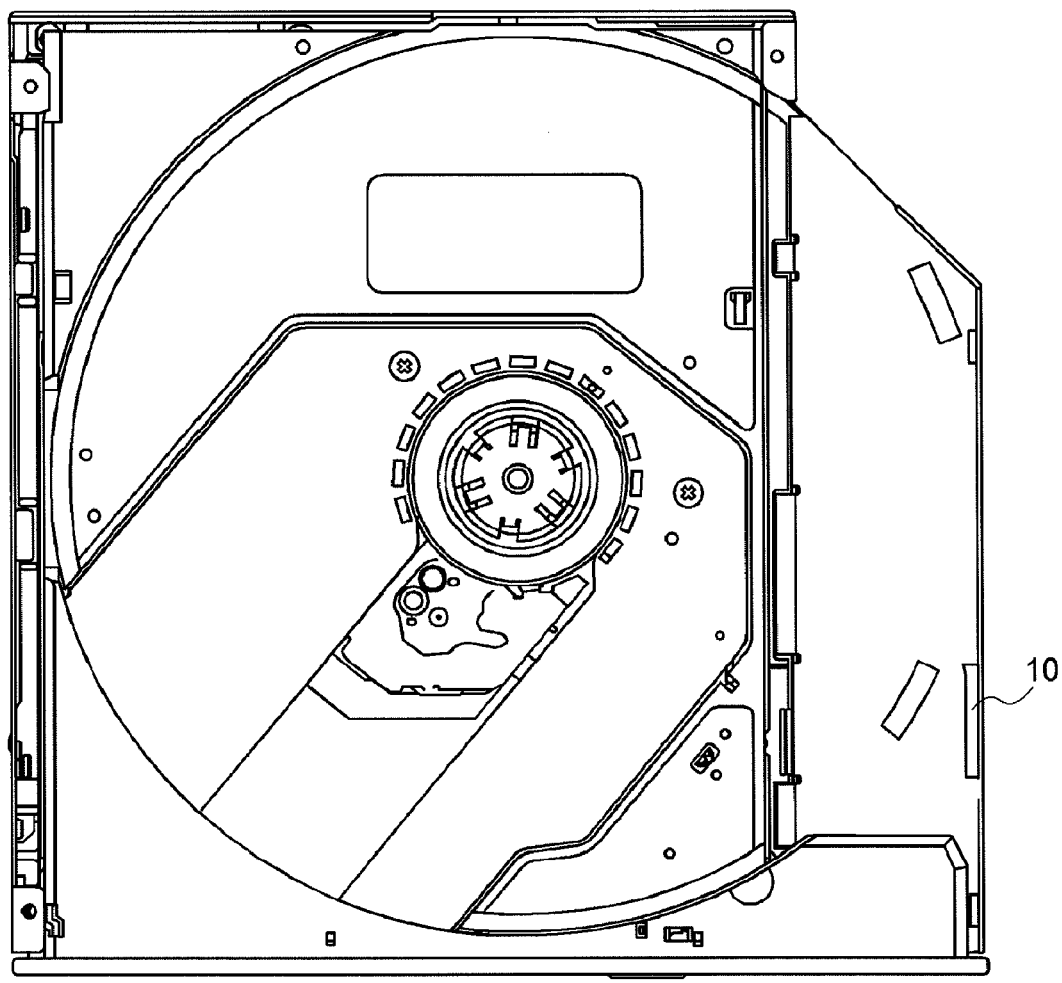
FIG. 3A is a top view of the prior art optical disk apparatus wherein the tray is inserted in the chassis.

FIG. 3A is a top view of the prior art optical disk apparatus wherein the tray is inserted in the chassis.

Figure 3B:
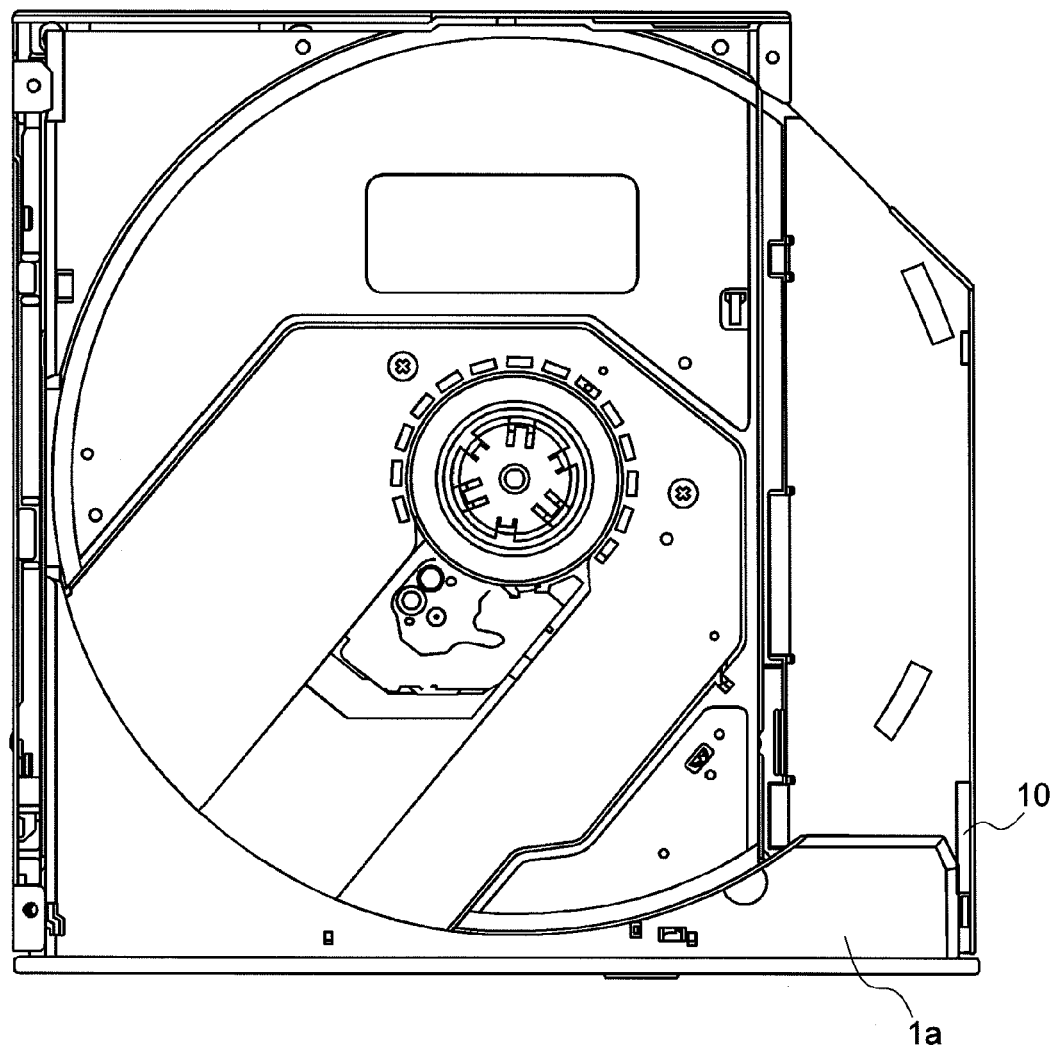
FIG. 3B is a top view of the optical disk apparatus in accordance with the embodiment of the present invention wherein the tray is inserted in the chassis.

FIG. 3B is a top view of the optical disk apparatus in accordance with the embodiment of the present invention wherein the tray is inserted in the chassis.

Figure 4A:
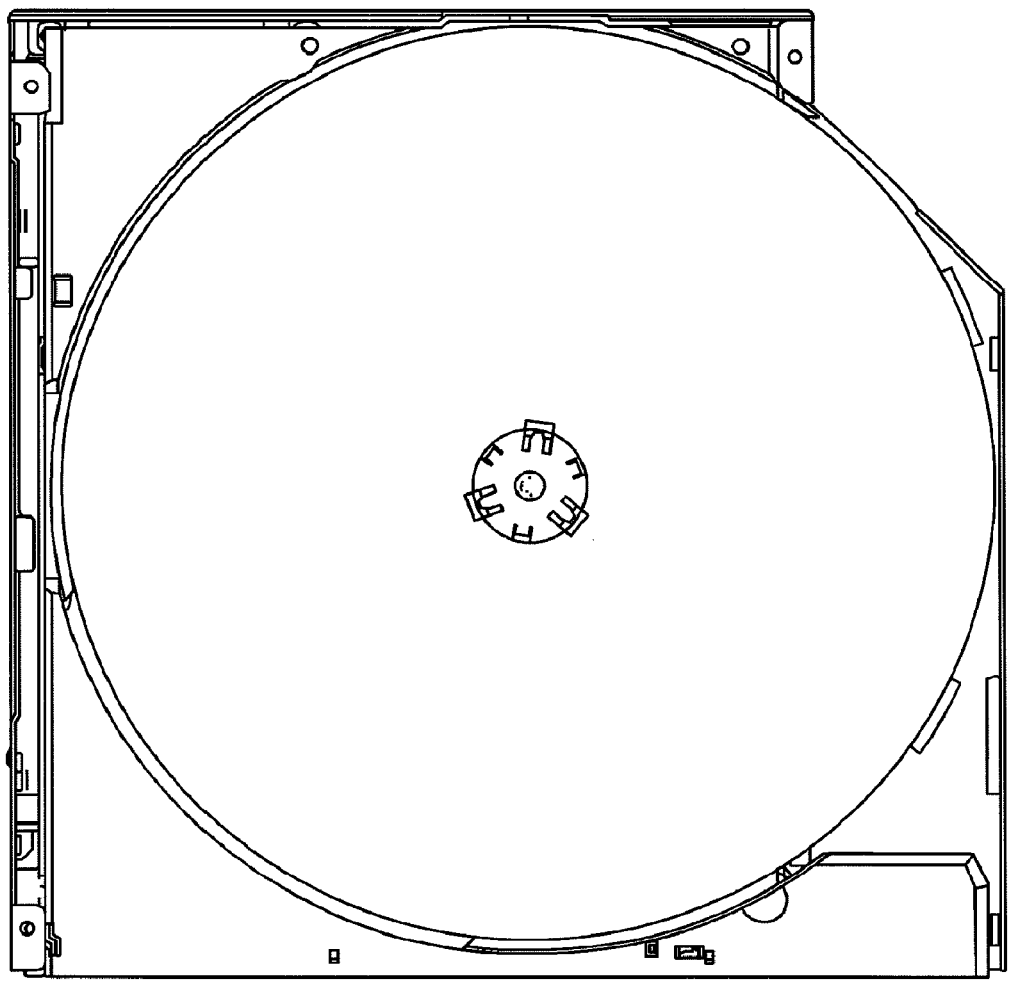
FIG. 4A shows a (first) state of the prior art optical disk apparatus during the process of ejecting or inserting the tray.
Figure 4B:
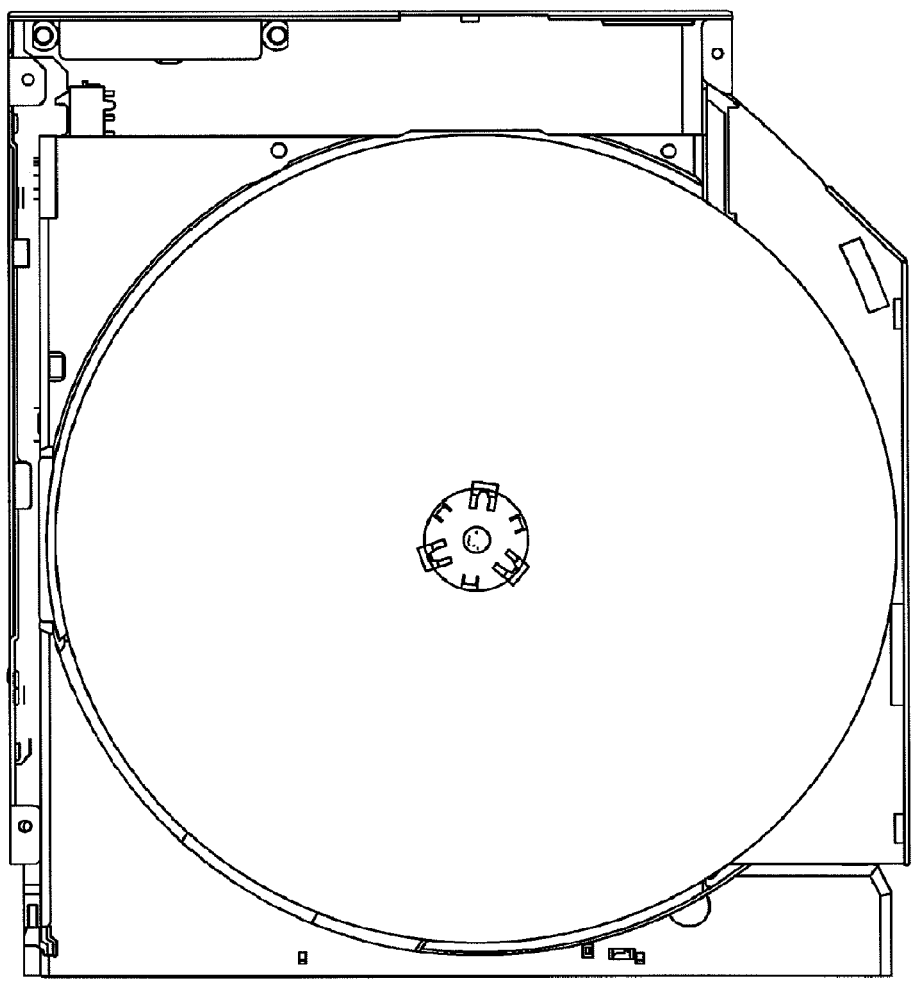
FIG. 4B shows a (second) state of the prior art optical disk apparatus during the process of ejecting or inserting the tray.
Figure 4C:
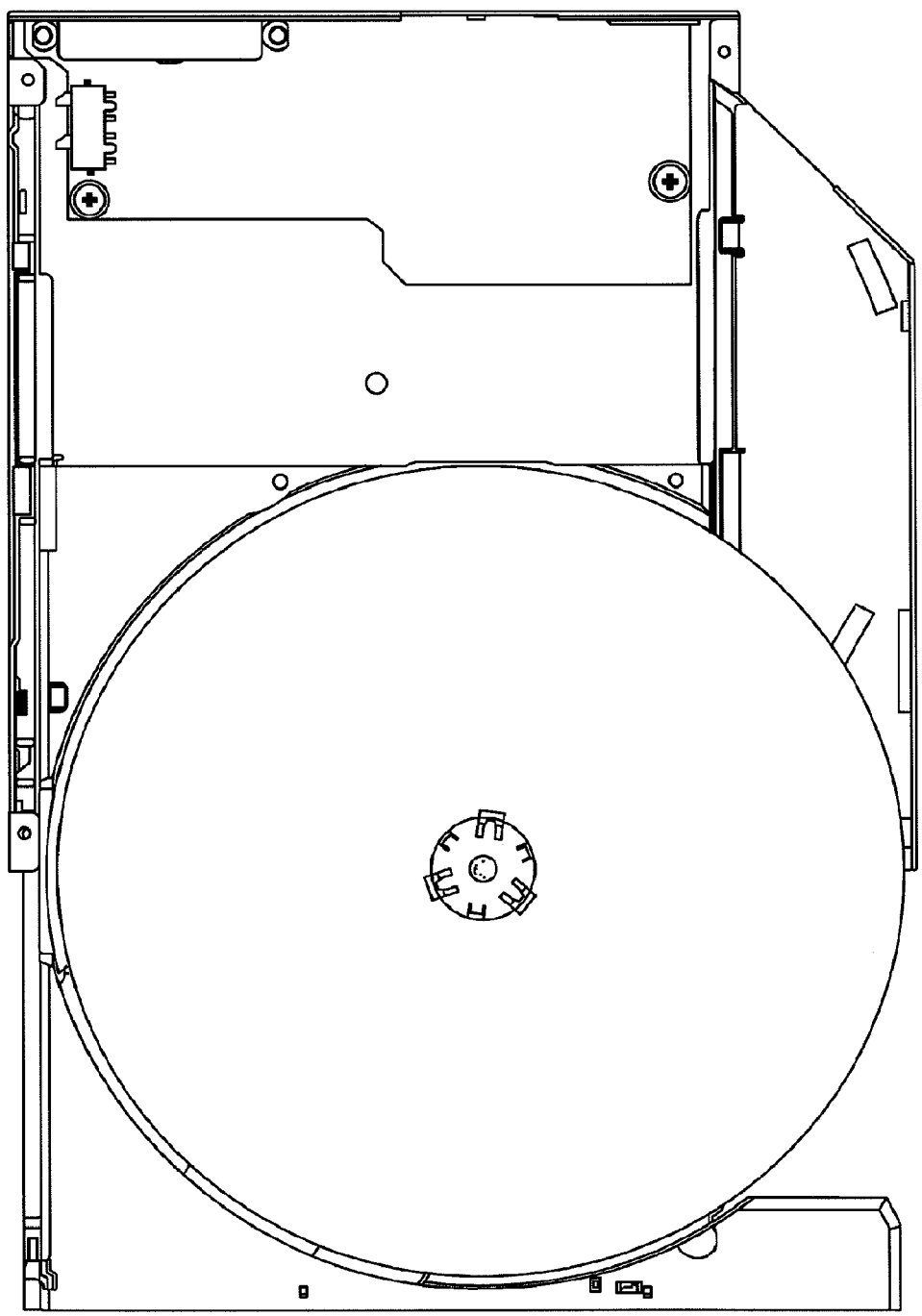
FIG. 4C shows a (third) state of the prior art optical disk apparatus during the process of ejecting or inserting the tray.

FIG. 4A through 4C show respective states of the prior art optical disk apparatus during the process of ejecting or inserting the tray.

Figure 5A:
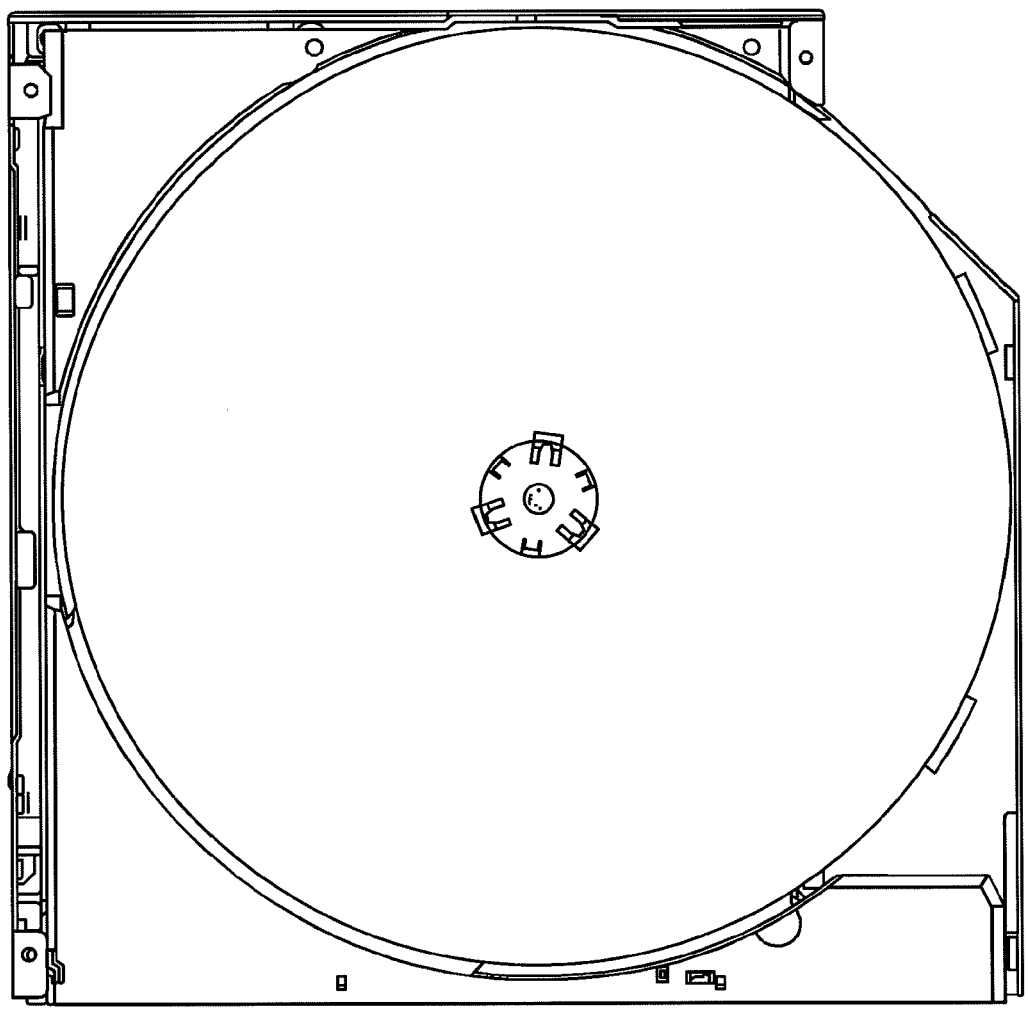
FIG. 5A shows a (first) state of the optical disk apparatus in accordance with the present embodiment during the process of ejecting or inserting the tray.
Figure 5B:
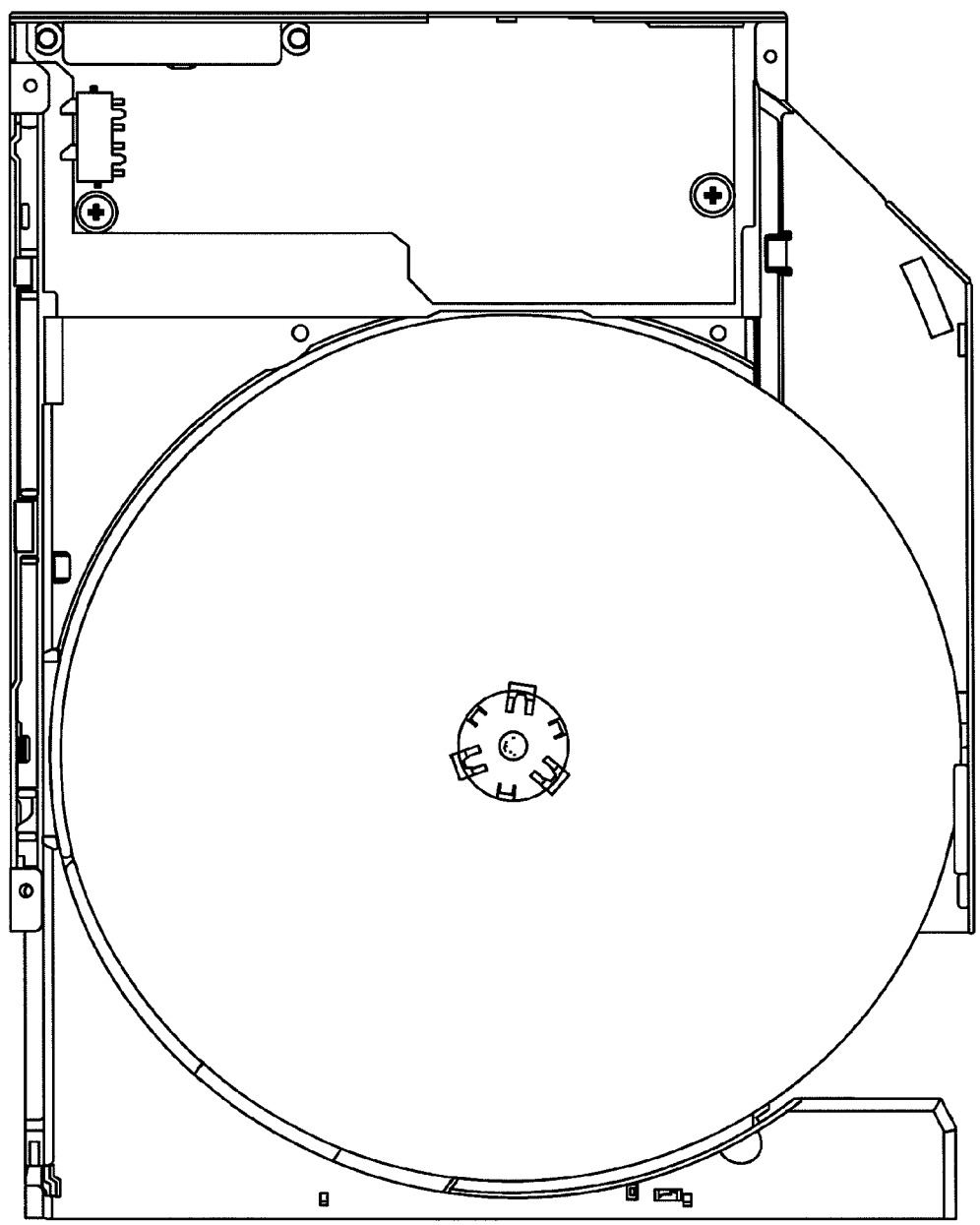
FIG. 5B shows a (second) state of the optical disk apparatus in accordance with the present embodiment during the process of ejecting or inserting the tray.
Figure 5C:
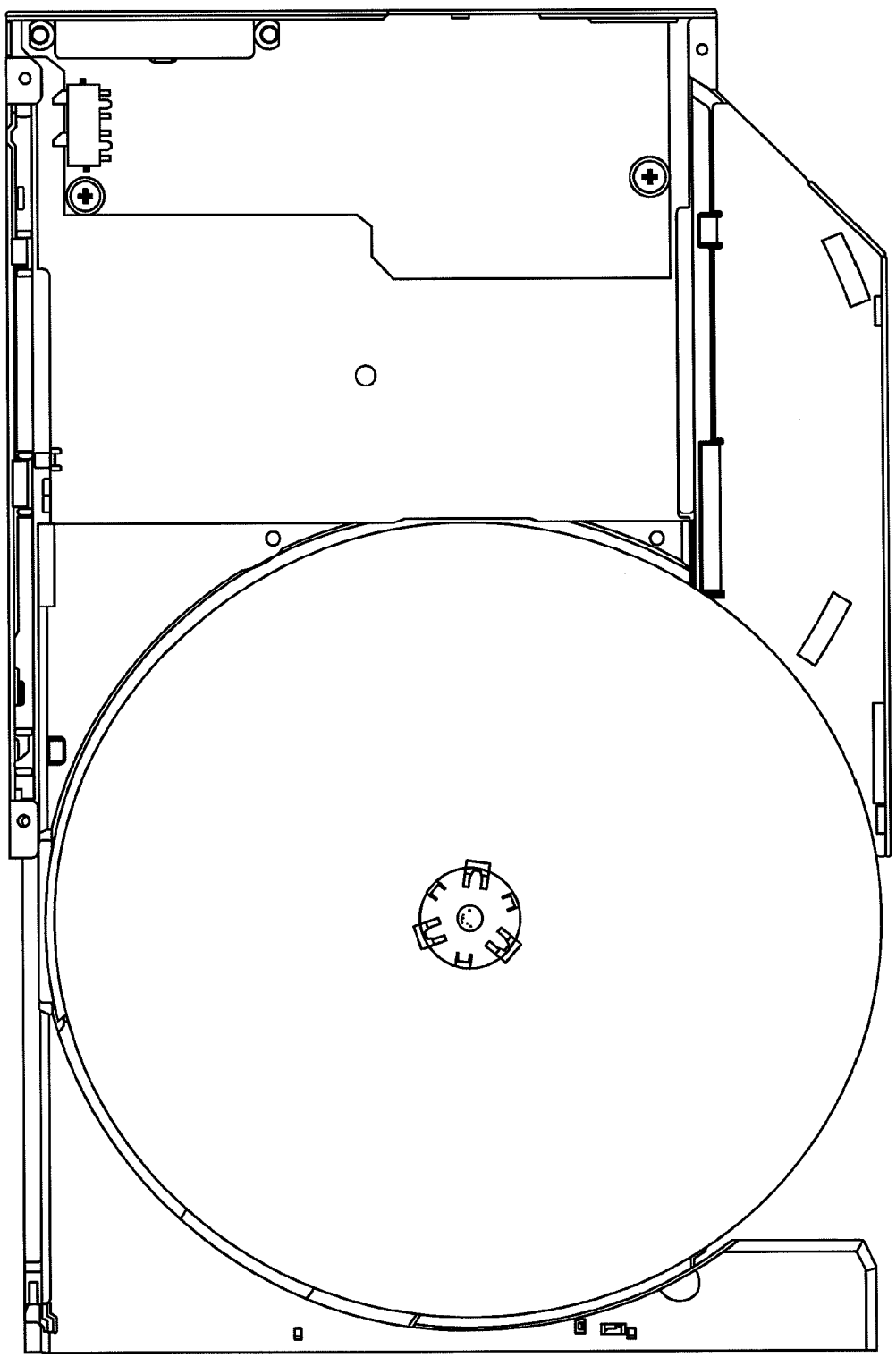
FIG. 5C shows a (third) state of the optical disk apparatus in accordance with the present embodiment during the process of ejecting or inserting the tray.

FIG. 5A through 5C show respective states of the optical disk apparatus in accordance with the present embodiment during the process of ejecting or inserting the tray.

Figure 6A:
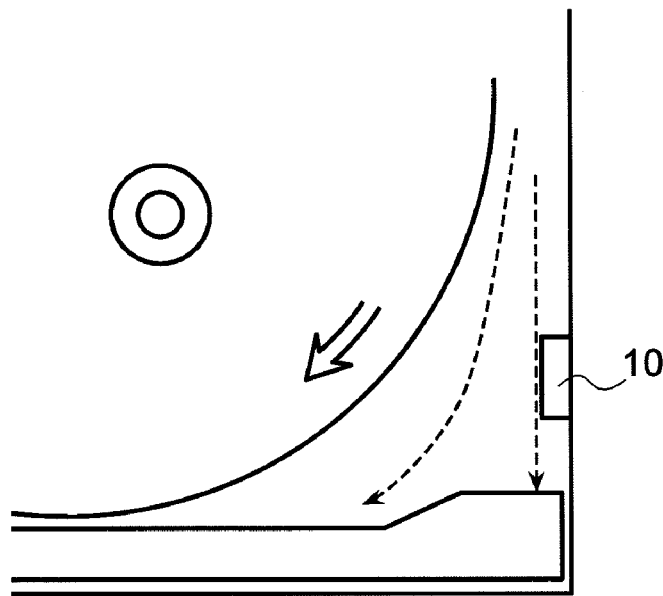
FIGS. 6A, and 6B are is depicted for explaining air flows within an optical disk apparatus when the optical disk is rotating.
Figure 6B:
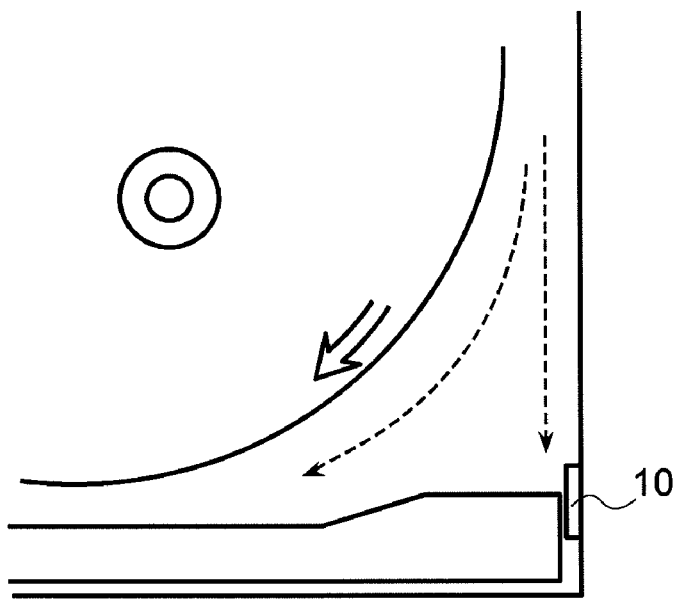

FIGS. 6A, and 6B are depicted for explaining air flows within an optical disk apparatus when the optical disk is rotating.

Figure 7A:
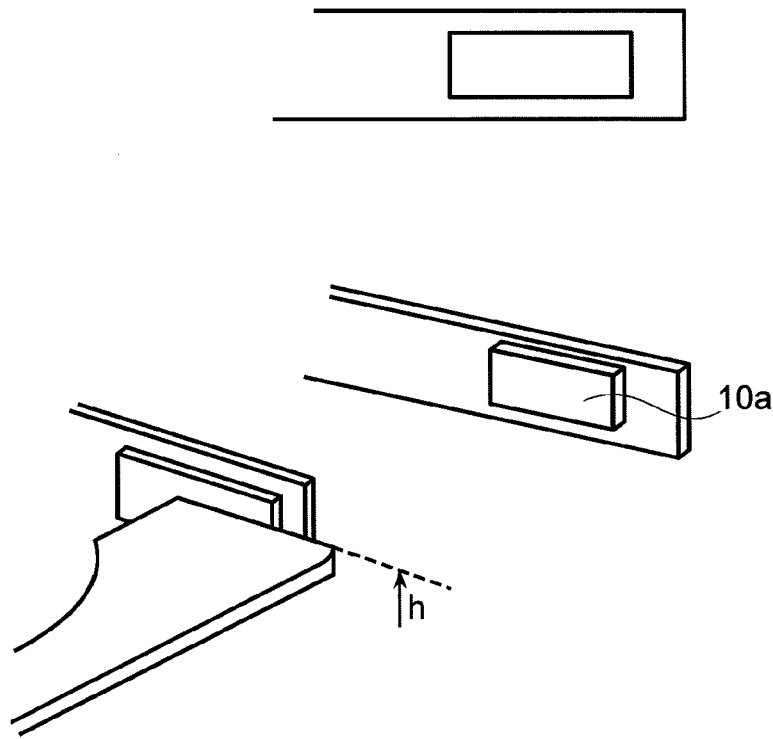
FIGS. 7A, and 7B are is depicted for explaining the shapes of brake pads.
Figure 7B:
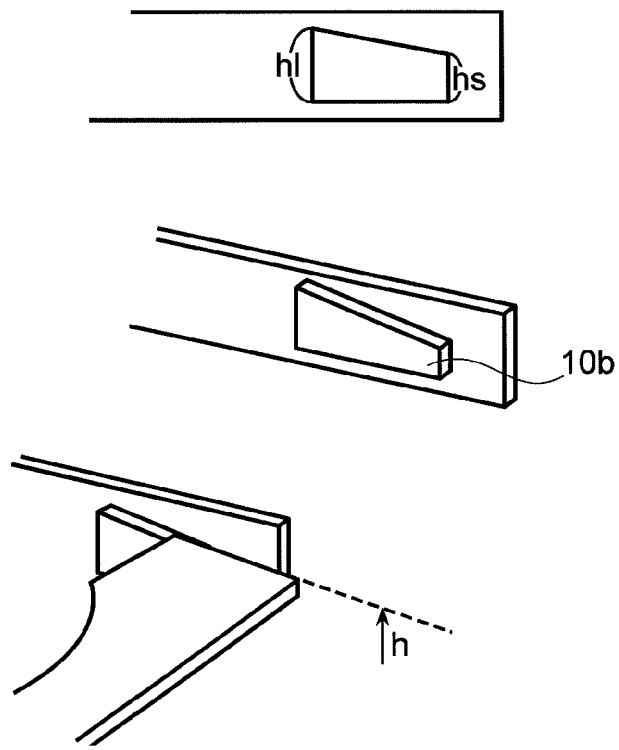

FIGS. 7A, and 7B are depicted for explaining the shapes of brake pads.

An optical disk apparatus in accordance with the present embodiment is a slim-type drive unit which is to be incorporated in a notebook PC or the like. As shown in FIG. 1A and FIG. 1B, it is designed so that if an eject button 30 is pushed or an eject operation is made from a personal computer (hereinafter, denoted as "PC"), a mechanical structure works to eject the optical-disk loading tray 1 from the chassis block which is formed by fitting together a top chassis 5 and a bottom chassis 4.

In FIG. 1A, the top chassis 5 and bottom chassis 4 of the chassis block remain fit together. In FIG. 1A, the top chassis 5 is removed from the bottom chassis 4 of the chassis block.

The tray 1 has a front portion 1a whose width α is larger than the rear width β. Due to the front parts attached to this front portion 1a, the inside is not visible when the tray 1 is inserted in the chassis block.

To read/write data to/from a CD, DVD or other optical disk, the user sets the optical disk on the turn table 9 by fixing it around the axial chuck 6 and inserts the tray 1 in the chassis block. Laser light to read/write data is applied from the optical pickup 7. When data is read/written, the turn table 4 is rotated by a spindle motor which is not shown in the figure.

After the data read/write processing is complete, the user ejects the tray 1 by pushing the eject button or making an eject operation from the PC and then removes the optical disk.

Usually, if the eject button is pushed or an eject operation is made from the PC, the tray 1 comes out after the turn table 9 stops rotating, allowing the user to remove the optical disk. If the optical disk can not be ejected for some reason, forced ejection may be done by inserting a pin into an eject hole 31. Because of this, the conventional optical disk apparatus has a brake pad 10 provided on the bottom chassis 4 as shown in FIG. 2A and FIG. 3A in order to stop the optical disk which is rotating at high speed.

In the case of the forced ejection, the rotation of the optical disk 0 is stopped by the brake pad 10 which contacts the optical disk 0 when the tray 1 is being ejected from the chassis block. This brake pad 10 has an elastic body made of felt, rubber or the like. Note that in FIG. 2A and FIG. 3A, the top chassis 5 is removed in order to make visible the tray 1 inserted in the chassis block.

In FIG. 4A, the tray 1 is in the chassis block, and the optical disk 0 is rotating. In FIG. 4B, the optical disk 0 is in contact with the brake pad 10. In FIG. 4C, the tray 1 is ejected from the chassis block.

As shown in FIG. 2A and FIG. 3A, the conventional brake pad 10 is provided along a side wall of the bottom chassis 4 and located about 15 mm to 20 mm behind the tray's front portion 1a.

In the present embodiment, as shown in FIG. 2B and FIG. 3B, the brake pad 10 is provided along a side wall of the bottom chassis 4 and located so as to contact the tray's front portion 1a when the tray 1 is inserted in the chassis block.

Respective states of the tray 1 in the present embodiment are shown. In FIG. 5A, the tray 1 is in the chassis block, and the optical disk 0 is rotating. In FIG. 5B, the optical disk 0 is in contact with the brake pad 10. In FIG. 5C, the tray 1 is ejected from the chassis block.

Locating the brake pad 10 as in the present embodiment provides substantially the same effect of lowering the rotation speed of the optical disk 0 as the conventional arrangement provides. As understood from comparison between FIGS. 4A-4C and FIGS. 5A-5C, there is no difference except that the optical disk 0 contacts the brake pad 10 at a different timing.

As shown in FIG. 2B, FIG. 3B and FIG. 5A, however, the present embodiment is arranged so that the brake pad 10 comes into tight contact with the tray's front portion 1a when the tray 1 is inserted in the chassis block.

Therefore, when the spindle motor of the optical disk apparatus is being driven to rotate, it is possible to prevent the tray 1 from vibrating and consequently reduce the noise caused by the rotation.

In addition, as another effect, the air flows caused by the rotation of the optical disk 0 become smooth.

In the prior art optical disk apparatus, since the brake pad 10 is nearer to the optical disk 0 as shown in FIG. 6A, air flows generated by the rotation are hit and scattered by the brake pad 10, resulting in a noise. In the present embodiment, since the brake pad 10 is located closer to the front, that is, more distant from the optical disk 0, as shown in FIG. 6B, air flows generated by the rotation are less hit by the brake pad 10, resulting in smoother air flows.

The brake pad of the present embodiment may have a rectangular profile as shown in FIG. 7A. Similar to the prior art one, the upper side of the brake pad 10a is above the height h of the tray's front portion 1a. This results in tight contact between the tray's front portion 1a and the brake pad 10a.

In addition, as shown in FIG. 7B, the brake pad 10b may have such a trapezoidal profile that the upper side becomes lower toward the front edge wherein the height h of the tray's front portion 1a is larger than the length hs of the short lateral side but smaller than the length hl of the long lateral side.

As compared with the rectangular one, this tapered brake pad of FIG. 7B can facilitate insertion of the tray 1 while securing tight contact with the tray's front portion 1a and the brake pad 10b.

What is claimed is:

1. An optical disk apparatus which rotates an optical disk and records/reproduces information thereto/therefrom by applying laser light thereto from an optical pickup, comprising:

a chassis block constructed by fitting together a top chassis and a bottom chassis;

a tray comprising a turn table on which the optical disk is loaded and rotated, wherein the tray is inserted into the chassis block when information is recorded/reproduced and ejected from the chassis block when the optical disk is removed; and a brake pad which is made of elastic material and located near to the front end of the chassis block along the inner surface of a side wall of the bottom chassis;

wherein the optical disk touches the brake pad in the process of ejecting the tray from the chassis block, and the brake pad is in tight contact with a side face of the front portion of the tray when the tray is inserted in the chassis block.

2. An optical disk apparatus according to claim 1 wherein the brake pad has a trapezoidal profile having a short lateral side and a long lateral side, the short lateral side being located lower than the height of the tray, the long lateral side being located higher than the height of the tray.

* * * * *